Dec. 5, 1950     A. A. ANDERSEN ET AL     2,532,530
CROP DRYING APPARATUS
Filed Dec. 14, 1946                                           2 Sheets—Sheet 1
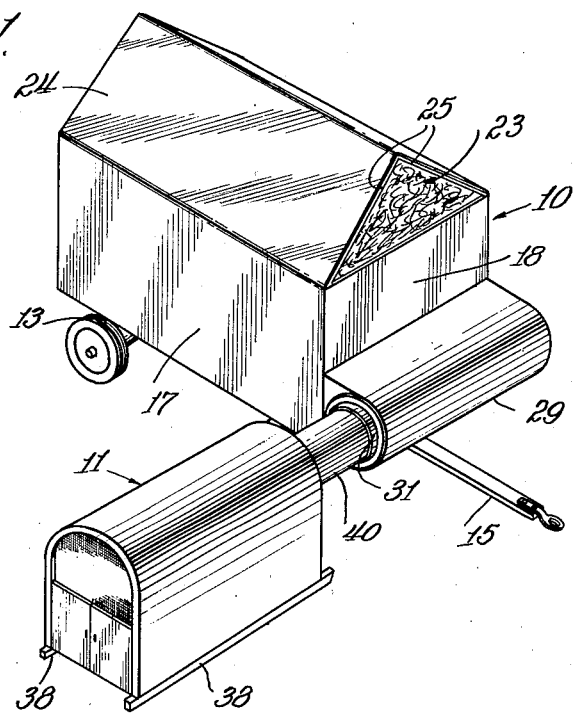
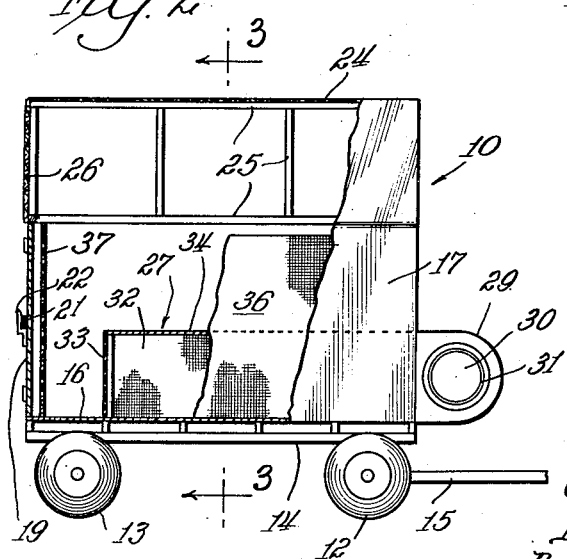
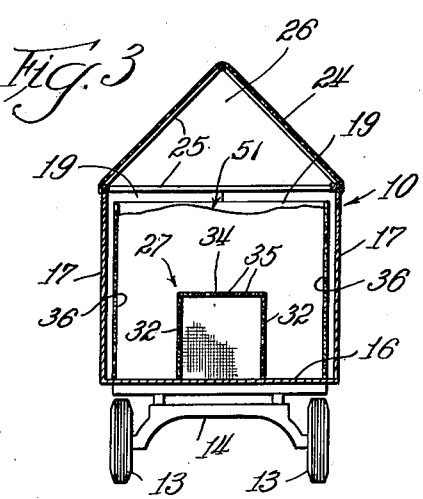
INVENTORS
Arthur A. Andersen
Bernard C. Mathews
By: Eugene M. Giles Atty.

Dec. 5, 1950  A. A. ANDERSEN ET AL  2,532,530
CROP DRYING APPARATUS
Filed Dec. 14, 1946  2 Sheets-Sheet 2
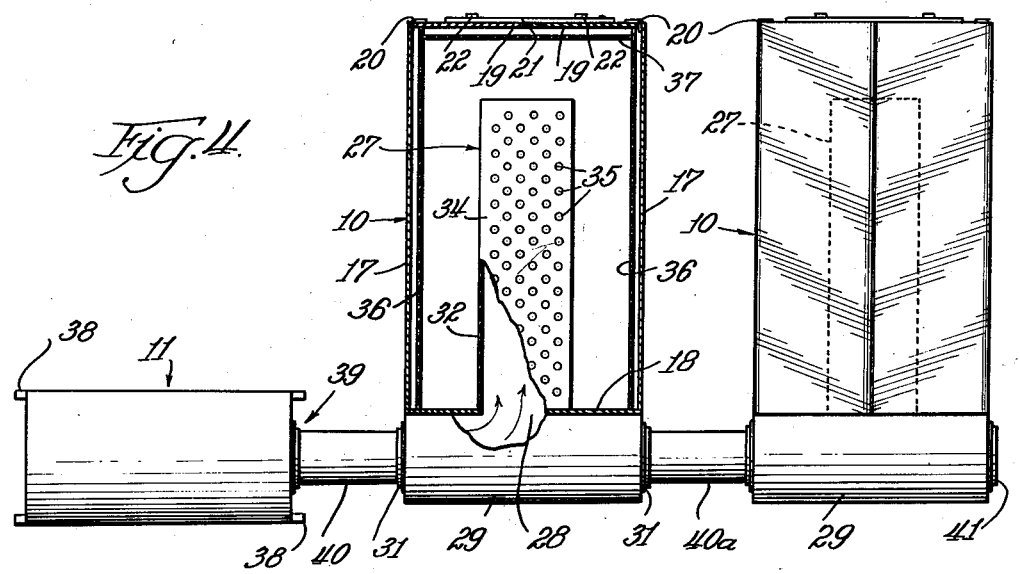
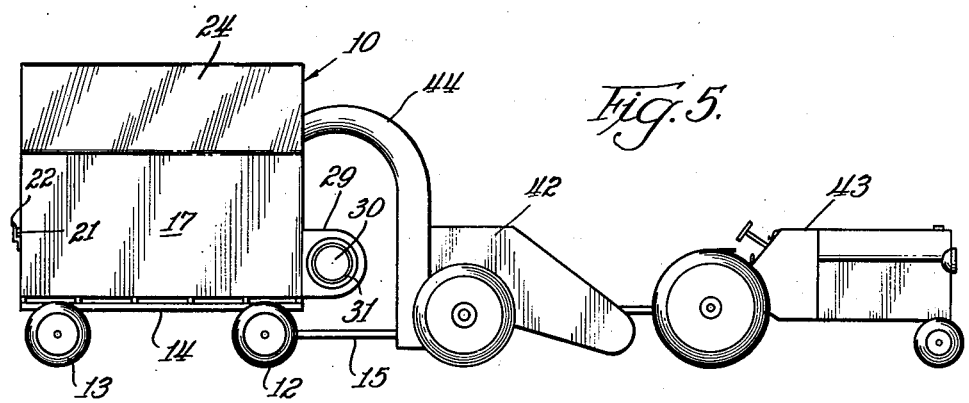
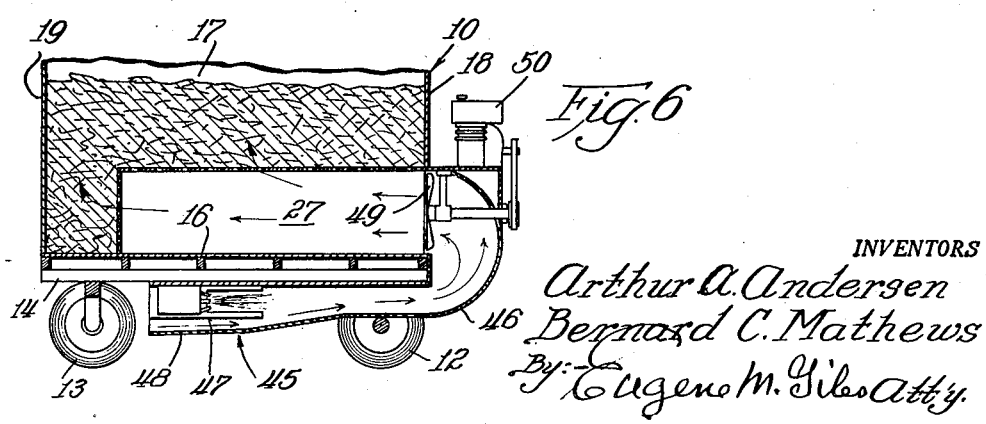
INVENTORS
Arthur A. Andersen
Bernard C. Mathews
By: Eugene M. Giles Atty.

Patented Dec. 5, 1950

2,532,530

UNITED STATES PATENT OFFICE 2,532,530

CROP DRYING APPARATUS

Arthur A. Andersen, Crystal Lake, and Bernard C. Mathews, Chicago, Ill., assignors to American Crop-Drying Equipment Company, Crystal Lake, Ill., a corporation of Illinois Application December 14, 1946, Serial No. 716,218

4 Claims. (Cl. 34—233)

Our invention relates to the drying or dehydrating of farm crops or the like and has reference more particularly to equipment whereby material, collected out in the field, is effectively dried in the compartment in which it is collected without any handling of the material other than normally required to collect and store same.

With certain farm crops, such as alfalfa, hay, grasses, corn and grains, which have a high moisture content, it is quite important for preservation thereof or to enhance the feeding or market value thereof that they be dried or dehydrated to a greater extent than obtainable with ordinary field drying conditions.

When such crops are to be stored away, it is necessary that their moisture content be sufficiently low to prevent heating and spoilage due to mold. Moreover, proper and adequate drying or dehydrating, especially of alfalfa, hay and grasses, preserves their color and vitamins and increases their feeding value.

Such drying or dehydrating, however, must be economical and with equipment which is usable on the farm to dry the crop when it is collected and before it is stored away for preservation or hauled away to market, and without delaying the harvesting and storage or delivery of the crop. It is also important that the equipment be simple and dependable and readily operable by the farmer, and it is quite desirable that it be portable so that it may be transported readily from one farm to another for group use by a number of different farmers.

The principal objects of our invention are to provide an improved apparatus for drying or dehydrating farm crops or the like which avoids extra handling and insures proper drying or dehydrating thereof; to permit the drying or dehydrating to be accomplished in the conveyance in which the crop is collected and transported from the field; to insure uniform drying of the crop; and to provide simple and convenient drying equipment which is economical and dependable and readily transportable from place to place, these and other objects being accomplished as pointed out more fully hereinafter and as shown in the accompanying drawings in which, Fig. 1 is a perspective view of a heating device coupled to a crop collecting unit for drying the contents thereof;

Fig. 2 is a side view of the crop collecting unit of Fig. 1 with portions broken away to disclose details of the construction;

Fig. 3 is a cross-sectional view of the crop collector taken on the line 3—3 of Fig. 2;

Fig. 4 is a plan view of the heater and collector of Fig. 1 with the top of the collector broken away and showing an additional collector coupled thereto for drying the contents;

Fig. 5 is a side view of the collector as it may be used in the field to collect alfalfa, hay or grasses therein; and Fig. 6 is a longitudinal sectional view of a modified form of crop collector.

In the preferred form of our invention as illustrated in Figs. 1 to 5 inclusive, the crop to be dried is collected out in the field in one or more conveyances, indicated as a whole by the reference numeral 10 and brought in to the drying location where it is coupled to a heater 11 which heats air to the proper temperature and circulates it through the contents of the conveyance 10.

The conveyance is of wagon type having running gear of substantially conventional type with front and rear wheels 12 and 13 respectively, having a wagon box supporting frame 14 thereon and a tongue 15 by which the conveyance is hauled from place to place.

The wagon box is of special construction, preferably about 7 feet wide, 14 feet long and 6 feet high, with bottom or floor 16, side walls 17, and front wall 18 and a rear end wall which may be removed or opened for unloading the contents of the wagon box. This rear end wall may, for example, be composed of two doors 19, 19 which are hinged to the side walls 17 as at 20 and close together midway between the sides of the wagon box, and they may be secured in the closed position by a bar 21 which engages in brackets 22 on the doors as shown.

This wagon box is provided with a cover or canopy of any suitable construction which is closed at the rear and open at the front to provide an opening 23 through which the wagon box is loaded and also to provide air escapement from the interior of the enclosure in the drying operation.

This cover or canopy may consist of a sheet 24 of canvas stretched over a light frame 25 which is secured on the top edge of the wagon box and provided with a rear end panel 26 of canvas which extends down to the top of the rear end wall 19, 19.

Mounted on the wagon box bottom 16 is an air duct 27, preferably of rectangular cross-section, as shown in Fig. 3, which extends from the front wall 18 of the wagon box nearly to the rear wall 19, 19 thereof, and this duct 22, at the front end thereof, communicates through an opening 28 in the wagon box front wall 18 with the interior of a hot air manifold 29 which extends across the front end of the wagon box body and has openings 30 at the opposite ends with a fitting 31 therearound for detachable connection therewith of a hot air duct or a cover.

This duct 27, which in the wagon box of the size above suggested, is preferably about two feet wide and three feet high, extends down the center of the wagon box floor 16 to within about two and one-half feet from the wagon box rear end wall 18, 19 so that it is substantially equally spaced from the side walls 17 and rear end wall 19, 19, and the side walls 32 and rear end wall 33 of this duct are preferably of wire mesh so that air from the air duct 27 is discharged quite freely into the spaces at the sides and rear end of the duct 27. The top wall 34 of the air duct 27 is preferably a panel with perforations 35 throughout the area thereof of such size and spacing to insure substantially less air flow therethrough than through the wire mesh walls 32 and 33.

To insure permeation of air from the duct 27 entirely through the mass of material at the sides, an inner wall 36 of wire mesh is provided at the inner side of each wagon box side wall 17 and coextensive therewith, this inner wire mesh wall 36 being spaced about one and one-half inches from the corresponding side wall 17 to provide an air space therebetween.

The doors 19, 19 may have similar wire mesh inner walls thereon if desired, although it is not essential as the air discharges through the rear end of the duct 27 with sufficient force to thoroughly permeate the material therebeyond.

The heater 11 may be of any type suitable to supply a large volume of heated air at the required temperature, and under sufficient pressure to circulate same into the manifold 29 and duct 27 and from the latter through the material which is loaded in the conveyance 10.

Preferably the heater 11 is of oil burner type with blower by which air is circulated therethrough and supplied under sufficient pressure to the wagon box dryer, and with temperature controls to regulate the temperature of the heated air so as to supply heated air to the dryer at the desired temperature.

This heater may be mounted on skids 38 or in any other manner so that it may be loaded conveniently on a truck or otherwise moved from place to place and has a hot air discharge opening therefrom indicated at 39 in Fig. 4 at substantially the same level as the end openings 30 in the manifold 29 of the conveyance 10.

Preferably the opening 39 from the heater 11 has a fitting therearound similar to the fittings 31 around the openings 30 of the manifold 29, and a flexible coupling 40 of canvas or the like is provided which has end fittings, preferably of bayonet joint type or the like, by which the ends of the coupling 40 may be detachably secured to the fittings 31 of the wagon box dryer manifold 29 and to the corresponding fitting of the heater opening 39.

Thus, when the contents of the conveyance 10 is to be dried or dehydrated, the conveyance is drawn into position with one of the manifold openings 30 directly in front of the heater opening 39 and at a proper distance therefrom to accommodate the canvas coupling 40 therebetween, and the opposite ends of said coupling are secured to the fittings around the openings 39 and 30 respectively so that the heated air from the heater 11 is discharged into the manifold 29.

The other manifold opening 30 at the opposite end should be closed to confine the heated air for discharge into the duct 27 and for this purpose a cap is provided, one of which is indicated at 41 in Fig. 4 which is detachably securable to the fittings 31 of the openings 30.

In practice, a number of conveyances 10 will be employed so that some of them may be out collecting the crop while others are at the drying station having the contents thereof dried or dehydrated, and the heater 11 is preferably of such capacity and the conveyances 10 so arranged that a number thereof may be coupled to the heater and the contents thereof dried simultaneously.

To this end, a number of flexible couplings 40 are provided and one or more additional conveyances 10 may be drawn up with their manifolds 29 in line and connected in series by couplings 40 and with the cap 41 closing the outer opening 30 of the manifold 29 of the conveyance 10 farthest from the heater 11.

Two conveyances 10 are illustrated in such series connection in Fig. 4 with an extra coupling 40 connecting the two manifolds 29 as indicated at 40a and the cap 41 closing the outer opening 30 of the manifold 29 of the conveyance 10 farthest from the heater 11, but it will be understood that additional conveyances 10 may in like manner be connected in series therewith if desired.

In using the equipment above described, the heater 11 is set up at a convenient place for drying, and a conveyance 10 is taken out in the field and loaded with a quantity of the particular crop to be harvested and dried.

If the crop to be harvested is alfalfa, hay or grasses, a conventional pick-up chopper, such as indicated at 42 in Fig. 5 and preferably drawn by a tractor 43, may have the conveyance 10 attached to the rear thereof by the tongue 15. This pick-up chopper, as it is drawn across the field, picks up the alfalfa, hay or grass and chops it into short lengths and discharges the chopped material through a spout 44, the discharge end of which projects through the conveyance opening 23 so that it discharges in the wagon box of the conveyance 10.

Thus, the tractor 43 draws the pick-up chopper and the trailing conveyance 10 across the field until the wagon box of the conveyance is loaded to a level somewhat as indicated at 51 in Fig. 3, then the conveyance 10 is disconnected from the pick-up chopper, another empty conveyance 10 substituted, and the loaded conveyance 10 hauled in to heater 11 and coupled thereto by means of a coupling interposed between the heater outlet 39 and one of the manifold openings. The other manifold opening 30 having been closed by a cap 41, the heater 11 is then operated to supply heated air to the manifold 29 and duct 27, and this heated air is discharged from the duct 27 outwardly at both sides thereof and at the outer end thereof and also through the top wall 34, and thus, permeates throughout the entire batch of alfalfa, hay or grass continued in the conveyance 10.

The supplying of heated air, or heated air plus a finishing period of unheated air, is continued until the contents of the attached conveyance is properly dried or dehydrated whereupon the conveyance is disconnected and the contents are then ready for storage or other final disposition thereof.

As above pointed out, a number of loaded conveyances 10 may be connected with the heater in the manner shown in Fig. 4 and the contents of all these conveyances dried simultaneously.

The temperature of the heated air employed should be such that it does not burn or injure the material that is being dried, a temperature of approximately 180° F. to 190° F. having been found most appropriate for alfalfa hay and grasses which usually dry at that temperature in from 1 to 3 hours, depending on the moisture content, whereas a temperature of 130° F. to 150° F. is preferable for grains which dry at that temperature in about 5 hours.

Thus, the crop is dried or dehydrated in relatively small individual batches which permit uniform and proper drying or dehydrating throughout the mass, and there is no handling of the crop other than ordinarily required to harvest the crop and store it away or haul it to market, as it is collected, dried and disposed of in the same conveyance.

Instead of employing a stationary heater 11, each conveyance 10 may be provided with an individual heater thereon as shown in Fig. 6 so that drying may be performed while the material is being collected in the conveyance or while it is being transported from the field to the place of delivery.

In this structure of Fig. 6 the conveyance 10 is of the same construction as that of Figs. 1 to 5 inclusive with running gear having front and rear wheels 12 and 13 respectively, wagon box supporting frame 14, wagon box with bottom or floor 16, side walls 17, front and rear end walls 18 and 19 and hot air duct 27.

The manifold 29 of the Figs. 1 to 5 structure is omitted, however, and instead a heater 45 is mounted under the frame 14 and a duct 46 leads directly therefrom to the front of the conveyance where it is connected to the front end of the duct 27.

This heater 45 is preferably of oil burning type with the oil burner 47 inclosed in a spaced housing 48, and a fan 49 is provided at the forward end of the duct 27, operated by a gas engine 50 or in other convenient manner, to draw air through the burner 47 and through the space in the housing 48 around the burner, and discharge the heated air and gaseous products of combustion into the duct 27 for permeation through the contents of the conveyance 10.

Thus, the heater may be operated to dry or dehydrate material as it is collected in the conveyance 10 of Fig. 6, if desired, and it may be operated during transportation of the loaded conveyance 10 from place to place, and thus, utilize time for drying or dehydrating which is not available for that purpose with the stationary dryer of the structure of Figs. 1 to 5 inclusive.

In practice we have found that best drying results are obtained and substantial economies are effected by a two stage drying operation in the first state of which the heater is operated and heated air circulated through the mass in the wagon box after which the heater is turned off but the operation of the fan continued.

In this second stage of continuation of the operation of the fan after the heater is turned off, the temperature of the air quickly diminishes as the heater cools off and cool air is thereafter supplied and circulated through the wagon box and its contents, thereby cooling the wagon box contents which became heated by the circulation of heated air therethrough.

During this cooling stage, dehydration continues with the residual heat in the wagon box contents contributing materially thereto, and we have found that by operating the heater during only about two thirds of the entire drying time and merely circulating air through the wagon box contents during the remaining one-third of the time, not only are great economies in fuel effected but the material, at the completion of the drying, is at the desired temperature for handling and storage.

Moreover, in the drying by circulation of heated air through the mass the portions thereof nearest the point of entrance of the heated air dry more rapidly while the portion of the mass remote therefrom where the air leaves the mass dry more slowly, not only because of temperature drop but because of the accumulating moisture content of the air as it passes through the mass.

When, however, the unheated air is circulated through the mass in the second stage of the drying operation, the portions of the mass at the place of entry of the air thereinto become cooled sooner than the portions remote therefrom and as the air takes up heat therefrom as it progresses through the mass, the drying effect thereof is substantially the reverse of that during the heated air circulation in the respect that the drying effect is increased in the portions of the mass remote from the place of entry.

Thus, the two stage drying operation not only effects economies and finishes the drying at a desired temperature but increases the uniformity of the drying throughout the mass.

Either wagon box may be removed from the running gear and used as a stationary dryer if desired.

While we have shown and described our invention in a preferred form, we are aware that changes can be made therein without departing from the spirit of our invention, the scope of which is to be determined by the appended claims.

What is claimed is:

1. A portable farm crop collector and dryer comprising a wagon having a wagon box with a bottom and with front and rear end walls and two side walls extending around and forming an elongated drying compartment which extends from front to rear of the wagon, each of said side walls comprising laterally spaced, substantially coextensive outer and inner wall members, each of the latter members having a multiplicity of air openings therethrough distributively arranged throughout the area thereof, an elongated air distributor in the lower half of said compartment midway between said compartment side walls and comprising two laterally spaced side walls and a top wall forming a duct which extends lengthwise of the compartment, each of said air distributor walls having a multiplicity of air openings therethrough and uniformly distributed throughout the area thereof to supply air from the interior of the duct to the compartment space at the opposite sides of and above the duct, said duct having an air inlet through which air is supplied thereto from the exterior of the compartment.

2. A portable farm crop collector and dryer comprising a wagon having a wagon box with a bottom and with front and rear end walls and two side walls extending around and forming an elongated drying compartment which extends from front to rear of the wagon, the rear end wall being removable and each of said side walls comprising laterally spaced, substantially coextensive outer and inner wall members, each of the latter members having a multiplicity of air openings therethrough distributively arranged throughout the area thereof, an elongated air distributor in the lower half of said compartment midway between said compartment side walls and comprising two laterally spaced side walls and a top wall and a rear end wall forming a duct which extends lengthwise of the compartment, and terminates at a distance from the removable rear end wall of the wagon box substantially equal to the distance of the duct from the wagon box side walls, each of said air distributor walls having a multiplicity of air openings therethrough and uniformly distributed throughout the area thereof to supply air from the interior of the duct to the compartment space at the opposite sides of and above and at the rear of the duct, said duct having an air inlet through which air is supplied thereto from the exterior of the compartment.

3. A portable farm crop collector and dryer comprising a wagon having a wagon box with a bottom and with front and rear end walls and two side walls extending around and forming an elongated drying compartment which extends from front to rear of the wagon, each of said side walls comprising laterally spaced, substantially coextensive outer and inner wall members, each of the latter members having a multiplicity of air openings therethrough distributively arranged throughout the area thereof, an elongated air distributor in the lower half of said compartment midway between said compartment side walls and comprising two laterally spaced side walls and a top wall forming a duct which extends lengthwise of the compartment, each of said air distributor walls having a multiplicity of air openings therethrough and uniformly distributed throughout the area thereof to supply air from the interior of the duct to the compartment space at the opposite sides of and above the duct, said duct having an air inlet through which air is supplied thereto from the exterior of the compartment, said wagon box having a cover over the compartment and an opening at the front above the compartment for loading and the rear end wall of the wagon box being removable for unloading.

4. A portable farm crop collector and dryer comprising a wagon having a wagon box with a bottom and with front and rear end walls and two side walls extending around and forming an elongated drying compartment which extends from front to rear of the wagon, each of said side walls comprising laterally spaced, substantially coextensive outer and inner wall members, each of the latter members having a multiplicity of air openings therethrough distributively arranged throughout the area thereof, an elongated air distributor in the lower half of said compartment midway between said compartment side walls and comprising two laterally spaced side walls and a top wall forming a duct which extends lengthwise of the compartment, each of said air distributor walls having a multiplicity of air openings therethrough and uniformly distributed through the area thereof to supply air from the interior of the duct to the compartment space at the opposite sides of and above the duct, said duct having an air inlet through which air is supplied thereto from the exterior of the compartment, the height of said duct being approximately one-half the height of said drying compartment and the width of said duct being approximately one-third the width of said compartment.

ARTHUR A. ANDERSEN.
BERNARD C. MATHEWS.

REFERENCES CITED

The following references are of record in the file of this patent:

UNITED STATES PATENTS

| Number | Name | Date |
| --- | --- | --- |
| 842,538 | Elward | Jan. 29, 1907 |
| 1,123,877 | Hill | Jan. 5, 1915 |
| 1,146,458 | Stroband | July 13, 1915 |
| 1,330,195 | Kuhn | Feb. 10, 1920 |
| 1,368,134 | Gilchrist | Feb. 8, 1921 |
| 1,512,052 | Richardson | Oct. 21, 1924 |
| 1,580,767 | Skromme | Apr. 13, 1926 |
| 1,669,012 | Nordstrom | May 8, 1928 |
| 1,989,530 | Shodron | Jan. 29, 1935 |
| 2,196,391 | Gronert | Apr. 9, 1940 |
| 2,251,617 | Pirnie | Aug. 5, 1941 |
| 2,442,344 | Curtis | June 1, 1948 |
| 2,443,865 | Moffett, Jr. | June 22, 1948 |

FOREIGN PATENTS

| Number | Country | Date |
| --- | --- | --- |
| 132,237 | Switzerland | June 17, 1929 |
| 200,888 | Great Britain | July 18, 1923 |
| 497,022 | Germany | Oct. 25, 1928 |
| 504,259 | France | Apr. 9, 1920 |